No. 689,191. Patented Dec. 17, 1901.
F. M. HUNT.
HARNESS.
(Application filed Mar. 6, 1901.)
(No Model.)
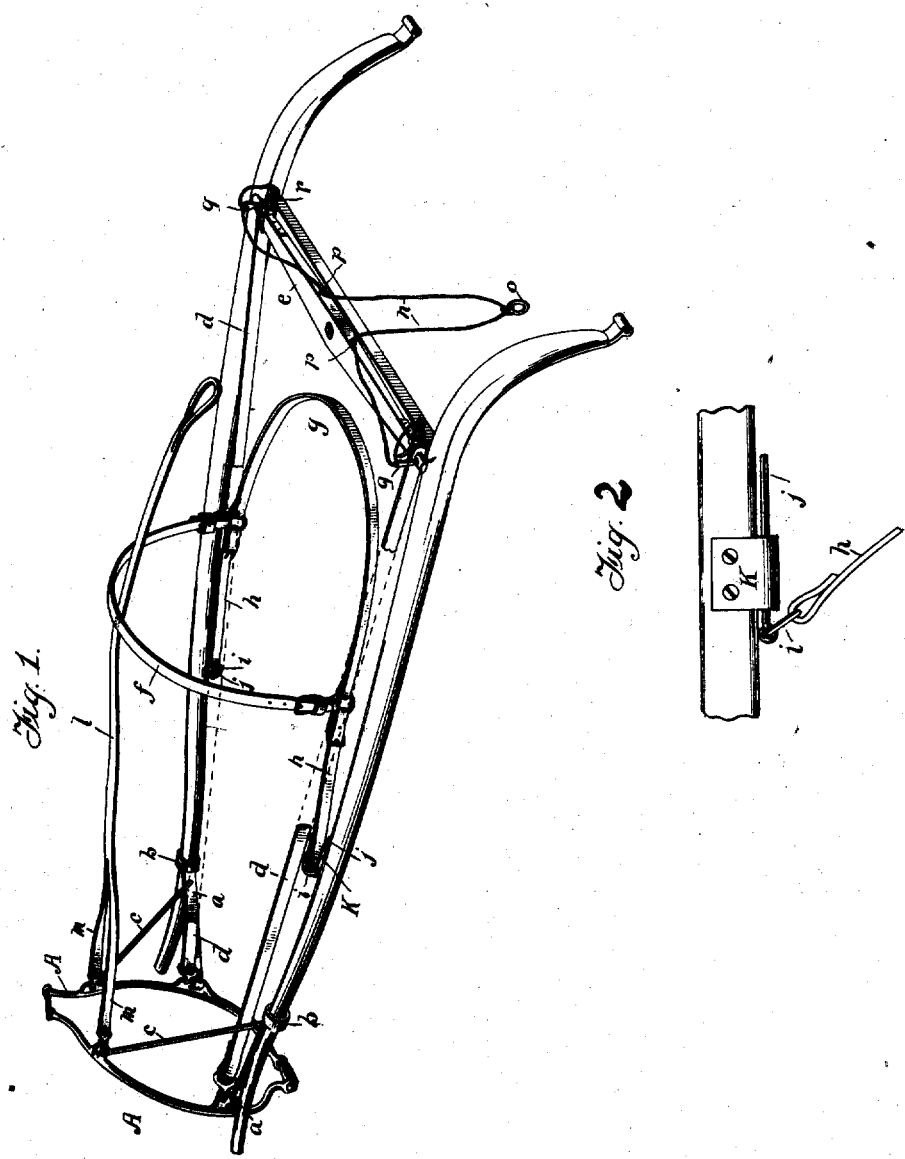
Witnesses
Louis E Langille
R H Bishop
Inventor,
Frank M Hunt,
By Davis & Davis,
Attorneys.

UNITED STATES PATENT OFFICE.

FRANK M. HUNT, OF ROUNDOAK, GEORGIA.

HARNESS.

SPECIFICATION forming part of Letters Patent No. 689,191, dated December 17, 1901.

Application filed March 8, 1901. Serial No. 50,353. (No model.)

*To all whom it may concern:*

Be it known that I, FRANK M. HUNT, a citizen of the United States of America, residing at Roundoak, in the county of Jones and State of Georgia, have invented certain new and useful Improvements in Safety-Harness, of which the following is a specification, reference being had therein to the accompanying drawings, in which—

Figure 1 represents a perspective view of my harness attached to a pair of buggy-shafts, the collar being removed; Fig. 2, a bottom view, a portion of one of the shafts, showing the holdback device more clearly.

The object of this invention is to provide a simple harness that will serve all the ordinary purposes of pulling and backing the vehicle and at the same time be readily detachable from the shafts in case the horse becomes unmanageable, thereby rendering the driving of a fractious animal entirely safe, as more fully hereinafter set forth.

Referring to the drawings by reference-letters, A A designate the hames, which are adapted to be connected together and to the collar in the usual way. Connected to each hame is a rearward-extending bar $a$, to the rear end of which is connected a ring or sleeve $b$, which is adapted to slide freely onto the shaft. Connecting the upper part of each hame to the rear end of the bar $a$, carried by that hame, is an inclined brace-rod $c$. The traces $d$ connect the hames to the singletree $e$ in the usual manner.

The hip-strap $f$ is connected to the breeching, preferably, and to the ends of these straps are connected the respective holdback-straps $h$, each of said holdback-straps being provided at its forward end with a ring $i$, to which is pivotally connected a rod $j$, which latter is inserted rearwardly through a socket $k$, rigidly fastened to the under side of the shaft, said rod $j$ being adapted to pass freely out of the socket in a forward direction when the animal is released. The back-strap $l$ is attached to the hip-strap and passes forward and is provided with two branches $m$, which are connected to the respective hames.

It will be observed that when the traces are released from the singletree (which is preferably done by the means hereinafter set forth) the holdback-pins $j$ and the shaft-rings $b$ may slide forward freely and be entirely detached from the shafts.

It will be observed that this harness does not need a saddle or girth. The weight of the forward ends of the shafts is taken by the hames and the shafts are prevented from rearing up at their forward ends, because of the fact that straps $m$ keep the collar from riding forward on the horse's neck and the shafts cannot rise unless the collar does move forward.

I do not claim these trace-releasing devices in this patent, and I desire it understood that I reserve the right to use any form of trace-releasing devices in connection with my safety-harness.

The rings or sleeves $b$ are free to slide back and forth on the shafts, so that there will be sufficient ease of movement for the horse, and the holdback-pins are of sufficient length to prevent detachment from the shafts until the animal moves forward out of the same.

To detach the traces from the driver's seat, I employ a pair of cords $n$, which are connected together by a pull-ring $o$, which is to be hung up loosely upon a hook or nail within easy reach of the driver. These cords are passed through guide-eyes $p$ on the singletree and are connected, respectively, to the upper ends of the leather pins $q$, employed to hold the traces on the respective ends of the singletree, so that when the cords are pulled on said pins will be withdrawn and the traces will be free to pass off the ends of the singletree. To insure the traces passing off the ends of the singletree, I pivot a throw-off lever $r$ at each end of the singletree, on the rear edge thereof, and connect their respective rear ends to the extremities of the respective cords at a point beyond the respective trace-pins $q$. The forward end of each of these levers is bifurcated, so as to embrace the singletree and press on the trace both above and below the singletree and insure a positive release of the trace. It will be seen that when the cords are pulled the trace-pins will be withdrawn first, and then with a further pull on the cords the rear ends of the throw-off levers will be drawn inward and the traces pushed off the ends of the singletree.

Having thus fully described my invention, what I claim is—

In combination, a pair of hames, a rearwardly-extending bar connected to each hame and carrying at its rear end a shaft-ring, a rigid brace connecting each of said bars to the upper portion of its hame, a back-strap connected at its forward end to the hames, a hip-strap connected to the back-strap, holdback-straps and means for connecting them detachably to the shafts of a vehicle, and traces connected to the hames and adapted to be connected to the vehicle, substantially as and for the purposes set forth.

In testimony whereof I hereunto affix my signature, in the presence of two witnesses, this 5th day of March, 1901.

FRANK M. HUNT.

Witnesses:
JOSEPH W. BARREN,
JAMES T. WILBURN.